United States Patent
Odaira et al.

(10) Patent No.: US 12,286,698 B2
(45) Date of Patent: Apr. 29, 2025

(54) PURE COPPER MATERIAL, INSULATING SUBSTRATE, AND ELECTRONIC DEVICE

(71) Applicant: MITSUBISHI MATERIALS CORPORATION, Tokyo (JP)

(72) Inventors: Takumi Odaira, Kitamoto (JP); Yuki Ito, Kitamoto (JP); Kenichiro Kawasaki, Kitamoto (JP); Kazunari Maki, Kitamoto (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 18/839,782

(22) PCT Filed: Jul. 27, 2023

(86) PCT No.: PCT/JP2023/027613
§ 371 (c)(1),
(2) Date: Aug. 20, 2024

(87) PCT Pub. No.: WO2024/024898
PCT Pub. Date: Feb. 1, 2024

(65) Prior Publication Data
US 2025/0109462 A1    Apr. 3, 2025

(30) Foreign Application Priority Data

Jul. 29, 2022  (JP) .................................. 2022-121432
Jul. 25, 2023  (JP) .................................. 2023-120990

(51) Int. Cl.
*C22C 9/00*  (2006.01)
*B32B 15/04*  (2006.01)
(Continued)

(52) U.S. Cl.
CPC ................ *C22C 9/00* (2013.01); *B32B 15/04* (2013.01); *B32B 15/20* (2013.01); *B32B 18/00* (2013.01);
(Continued)

(58) Field of Classification Search
None
See application file for complete search history.

(56) References Cited

U.S. PATENT DOCUMENTS

| | | | |
|---|---|---|---|
| 11,732,329 B2* | 8/2023 | Matsunaga | ............... C22F 1/02 420/497 |
| 2016/0047017 A1* | 2/2016 | Maki | ..................... H01B 1/026 420/496 |

(Continued)

FOREIGN PATENT DOCUMENTS

| | | |
|---|---|---|
| CN | 114269957 A | 4/2022 |
| CN | 114302975 A | 4/2022 |

(Continued)

OTHER PUBLICATIONS

International Search Report mailed Oct. 24, 2023 for the corresponding PCT International Application No. PCT/JP2023/027613 (5 pages including English Translation).

(Continued)

*Primary Examiner* — Seth Dumbris
(74) *Attorney, Agent, or Firm* — Leason Ellis LLP; Melvin C. Garner; Mitsuhiro Haraguchi

(57) ABSTRACT

This pure copper material includes Cu in an amount of 99.9 mass % or more and 99.999 mass % or less, an average crystal grain size in a rolled surface is 10 μm or more, and when a measurement area of 1 mm² or more is measured by an EBSD method at a measurement interval of 1 μm, measurement points at which a CI value obtained by an analysis using data analysis software OIM is 0.1 or less are (Continued)

excluded, and boundaries between adjacent pixels with a misorientation of 5° or more are regarded as crystal grain boundaries, an average of local orientation spread (LOS) is 2.00° or less.

15 Claims, 2 Drawing Sheets

(51) Int. Cl.
  *B32B 15/20* (2006.01)
  *B32B 18/00* (2006.01)
(52) U.S. Cl.
  CPC ....... *B32B 2250/02* (2013.01); *B32B 2457/00* (2013.01); *Y10T 428/12431* (2015.01)

(56) References Cited

U.S. PATENT DOCUMENTS

| | | | |
|---|---|---|---|
| 2022/0025486 A1* | 1/2022 | Ito | ............................ C22C 9/00 |
| 2023/0002860 A1 | 1/2023 | Matsunaga et al. | |
| 2023/0112081 A1 | 4/2023 | Matsunaga et al. | |
| 2023/0114969 A1* | 4/2023 | Matsunaga | ......... H01L 23/3736 174/250 |

FOREIGN PATENT DOCUMENTS

| | | | |
|---|---|---|---|
| EP | 3950981 A1 | 2/2022 | |
| EP | 4116451 A1 | 1/2023 | |
| JP | 06002058 A | 1/1994 | |
| JP | 2017179493 A | 10/2017 | |
| WO | WO-2020122112 A1 * | 6/2020 | ........... C04B 37/021 |
| WO | 2020203071 A1 | 10/2020 | |
| WO | 2021107096 A1 | 6/2021 | |
| WO | 2021177460 A1 | 9/2021 | |
| WO | 2021177469 A1 | 9/2021 | |
| WO | 2021177470 A1 | 9/2021 | |

OTHER PUBLICATIONS

Chinese Office Action mailed Dec. 7, 2024 for the corresponding Chinese Patent Application No. 202380023423.2 (10 pages including English translation).

* cited by examiner

ELECTRON DIFFRACTION:
$Cu_5Ca$ (SPACE GROUP P6/mmm(191)) [-1 0 1]

PURE COPPER MATERIAL, INSULATING SUBSTRATE, AND ELECTRONIC DEVICE

CROSS-REFERENCE TO RELATED PATENT APPLICATIONS

This application is a U.S. National Phase Application under 35 U.S.C. § 371 of International Patent Application No. PCT/JP2023/027613 filed on Jul. 27, 2023, which claims the benefit of priority to Japanese Patent Application No. 2022-121432 filed on Jul. 29, 2022, and Japanese Patent Application No. 2023-120990 filed on Jul. 25, 2023, the contents of all of which are incorporated herein by reference in their entireties. The International Application was published in Japanese on Feb. 1, 2024 as International Publication No. WO 2024/024898 under PCT Article 21(2).

FIELD OF THE INVENTION

The present invention relates to a pure copper material suitable for electrical and electronic components such as heatsinks and thick copper circuits, especially a pure copper material used for an insulating substrate on which a power semiconductor or the like is mounted, an insulating substrate using this pure copper material, and an electronic device.

BACKGROUND OF THE INVENTION

In the related art, highly conductive pure copper materials have been used for electrical and electronic components such as heatsinks and thick copper circuits.

Recently, resistance heat generation has become a problem with an increase of the amount of a current used for components for electrical and electronic devices.

In semiconductor devices and the like, for example, an insulating substrate or the like in which a pure copper material is bonded to a ceramics substrate to form the above-described heatsink or thick copper circuit is used.

When the pure copper material is bonded to the ceramics substrate, a pressure treatment is performed in a high-temperature atmosphere; and therefore, crystal grains of the pure copper material may become coarsened or nonuniformly grow. This may cause bonding defects, appearance defects, or troubles during an inspection step.

In order to solve the problems, it is required that, even after a heat treatment, a change in crystal grain size is small and the crystal grain sizes are uniform in the pure copper material.

Therefore, for example, Japanese Unexamined Patent Application, First Publication No. H06-002058 and PCT International Publication No. WO2020/203071 propose a technology for suppressing the growth of crystal grains in a pure copper material.

Japanese Unexamined Patent Application, First Publication No. H06-002058 describes that, when 0.0006 to 0.0015 wt % of S is contained, it is possible to adjust the crystal grains to a certain size even in a case where a heat treatment is performed at a recrystallization temperature or higher.

In addition, in PCT International Publication No. WO2020/203071, since Ca is contained and a ratio between the amount of Ca and the total amount of O, S, Se, and Te is specified, crystal grain coarsening can be suppressed even in a case where a heat treatment is performed at 800° C.

CITATION LIST

Patent Documents

Patent Document 1: Japanese Unexamined Patent Application, First Publication No. H06-002058

Patent Document 2: PCT International Publication No. WO2020/203071

Technical Problem

Meanwhile, in Japanese Unexamined Patent Application, First Publication No. H06-002058 and PCT International Publication No. WO2020/203071, crystal grain coarsening is suppressed by specifying the composition, but there is a concern that crystal grain coarsening and a variation in crystal grain size cannot be sufficiently suppressed depending on the heat treatment conditions and the like.

In particular, in a case where a ceramics substrate and a copper sheet are firmly bonded to each other, a heat treatment is performed at a high temperature in a state in which the ceramics substrate and the copper sheet are pressurized in a lamination direction under a certain pressure. In this case, in the pure copper sheet, crystal grains are likely to nonuniformly grow, and the coarsening or nonuniform growth of the crystal grains may cause bonding defects, appearance defects, or troubles during an inspection step.

The present invention has been made in view of the above-described circumstances, and an object of the present invention is to provide a pure copper material in which it is possible to obtain a uniform crystal structure since a change in crystal grain size is small even after a heat treatment and a variation in crystal grain size is suppressed, an insulating substrate using the pure copper material, and an electronic device.

SUMMARY OF THE INVENTION

Solution to Problem

In order to solve the problems, the present inventors have conducted intensive studies, and as a result, they found that, in order to suppress crystal grain coarsening and a variation in crystal grain size during a heat treatment, it is important to control the "distribution of strains" in the material.

That is, examples of the driving force for the growth of crystal grains generated during the heat treatment include strains at crystal grain boundaries or in the grains. In a case where a driving force for the growth of the crystal grains is nonuniformly present in the material, the crystal grains do not uniformly grow, and thus phenomena such as local crystal grain coarsening and formation of mixed grain size microstructure occur. Therefore, it has been found that a material in which strains are uniformly dispersed is important for suppressing the growth of the crystal grains during the heat treatment.

The formation of mixed grain size microstructure is a state in which crystal grain sizes are not uniform and large crystal grains and small crystal grains are mixed.

The present invention has been made based on the above-described knowledge, and a pure copper material of Aspect 1 of the present invention is a pure copper material, in which an amount of Cu is in a range of 99.9 mass % or more and 99.999 mass % or less, an average crystal grain size in a rolled surface is 10 µm or more, and when a measurement area of 1 $mm^2$ or more is measured by an EBSD method at a measurement interval of 1 µm, measurement points at which a CI value obtained by an analysis using data analysis software OIM is 0.1 or less are excluded, and boundaries between adjacent pixels with a misorientation of 5° or more are regarded as crystal grain boundaries, an average of local orientation spread (LOS) is 2.00° or less.

According to the pure copper material of Aspect 1 of the present invention, since the amount of Cu is in a range of 99.9 mass % or more and 99.999 mass % or less, the pure copper material has particularly excellent conductive properties and heat radiation, and is particularly suitable as a material of a component for electronic and electrical devices for high-current uses.

In addition, since the average crystal grain size in the rolled surface is 10 μm or more, it is possible to suppress the proceeding of recrystallization during a heat treatment and it is possible to suppress crystal grain coarsening and microstructure nonuniformity.

In addition, since the average of LOS measured by the EBSD method is 2.00° or less, the strain distribution in the crystals is uniformized, a change in crystal grain size is small even after a heat treatment, and it is possible to obtain a uniform and fine crystal structure.

According to Aspect 2 of the present invention, in the pure copper material of Aspect 1, when a measurement area of 1 mm$^2$ or more is measured by an EBSD method at a measurement interval of 1 μm, measurement points at which a CI value obtained by an analysis using data analysis software OIM is 0.1 or less are excluded, and boundaries between adjacent pixels with a misorientation of 5° or more are regarded as crystal grain boundaries, an average of grain orientation spread (GOS) may be 2.000 or less.

According to the pure copper material of Aspect 2 of the present invention, since the average of GOS measured by the EBSD method is 2.000 or less, the strains are not localized in the crystals, a change in crystal grain size is still small even after a heat treatment, and it is possible to obtain a crystal structure that is more uniform and finer.

According to Aspect 3 of the present invention, in the pure copper material of Aspect 1 or 2, when a measurement area of 1 mm$^2$ or more is measured by an EBSD method at a measurement interval of 1 μm, measurement points at which a CI value obtained by an analysis using data analysis software OIM is 0.1 or less are excluded, and boundaries between adjacent pixels with a misorientation of 5° or more are regarded as crystal grain boundaries, a value of standard deviation of a kernel average misorientation (KAM) value may be 0.750 or less.

According to the pure copper material of Aspect 3 of the present invention, since the value of standard deviation of the KAM value measured by the EBSD method is 0.750 or less, the strains are not localized in the crystals, a change in crystal grain size is still small even after a heat treatment, and it is possible to obtain a crystal structure that is more uniform and finer.

According to Aspect 4 of the present invention, in the pure copper material of any one of Aspects 1 to 3, when a measurement area of 1 mm$^2$ or more is measured by an EBSD method at a measurement interval of 1 μm, measurement points at which a CI value obtained by an analysis using data analysis software OIM is 0.1 or less are excluded, and boundaries between adjacent pixels with a misorientation of 5° or more are regarded as crystal grain boundaries, an average of geometrically necessary dislocations (GNDs) may be $5.0 \times 10^{14}$ m$^{-2}$ or less.

According to the pure copper material of Aspect 4 of the present invention, since the amount of GN dislocations locally accumulated is kept small, a change in crystal grain size is still small even after a heat treatment, and it is possible to obtain a crystal structure that is more uniform and finer.

According to Aspect 5 of the present invention, in the pure copper material of any one of Aspects 1 to 4, one or more additive elements selected from Ca, Sr, and Ba may be included in a total amount of 300 mass ppm or less.

According to the pure copper material of Aspect 5 of the present invention, in a case where one or more additive elements selected from Ca, Sr, and Ba are included in a total amount of 5 mass ppm or more and 300 mass ppm or less, it is possible to more reliably suppress the growth of the crystal grains during a heat treatment without significantly affecting the material strength and the electrical conductivity. In a case where the total amount of the additive elements is 0 mass ppm or more and less than 5 mass ppm, the above-described effects are small.

According to Aspect 6 of the present invention, in the pure copper material of Aspect 5, compounds containing at least one of the additive elements and Cu may be included, and a number density of the compounds may be $1 \times 10^{-4}$ pieces/μm$^2$ or more.

According to the pure copper material of Aspect 6 of the present invention, since the number density of the compounds containing at least one of the additive elements and Cu is $1 \times 10^{-4}$ pieces/μm$^2$ or more, it is possible to more reliably suppress the growth of the crystal grains during a heat treatment by a pinning effect of the compounds.

According to Aspect 7 of the present invention, in the pure copper material of Aspect 6, the compounds may include one or more selected from $Cu_5Ca$, $Cu_5Sr$, and $Cu_{13}Ba$.

According to the pure copper material of Aspect 7 of the present invention, since the compounds includes one or more selected from $Cu_5Ca$, $Cu_5Sr$, and $Cu_{13}Ba$, it is possible to more reliably suppress the growth of the crystal grains during a heat treatment by a pinning effect of these compounds.

According to Aspect 8 of the present invention, in the pure copper material of any one of Aspects 1 to 7, one or more selected from S, Se, and Te may be included in a total amount of 10.0 mass ppm or less.

According to the pure copper material of Aspect 8 of the present invention, in a case where one or more selected from S, Se, and Te are included in a total amount of 0.2 mass ppm or more and 10.0 mass ppm or less, it is possible to more reliably suppress the growth of the crystal grains during a heat treatment. In a case where the total amount of one or more selected from S, Se, and Te is 0 mass ppm or more and less than 0.2 mass ppm, the above-described effects are small.

According to Aspect 9 of the present invention, in the pure copper material of any one of Aspects 1 to 8, an amount of O may be 100 mass ppm or less.

According to the pure copper material of Aspect 9 of the present invention, since the amount of O is limited to 100 mass ppm or less, it is possible to further suppress the growth of the crystal grains during a heat treatment.

According to Aspect 10 of the present invention, in the pure copper material of any one of Aspects 1 to 9, an amount of P may be in a range of 3.00 mass ppm or less.

According to the pure copper material of Aspect 10 of the present invention, in a case where the amount of P is in a range of 0.01 mass ppm or more and 3.00 mass ppm or less, O contained as an impurity can be neutralized, and it is possible to further suppress the growth of the crystal grains during a heat treatment. In a case where the amount of P is 0 mass ppm or more and less than 0.01 mass ppm, the above-described effects are small.

According to Aspect 11 of the present invention, in the pure copper material of Aspect 5, a mass ratio A/B of a total amount A of Ca, Sr, and Ba to a total amount B of P, S, Se, Te, and O may be more than 1.0.

According to the pure copper material of Aspect 11 of the present invention, since the mass ratio A/B of the total amount A of Ca, Sr, and Ba to the total amount B of P, S, Se, Te, and O is in the above-described range, it is possible to suppress the consumption of Ca, Sr, and Ba in which Ca, Sr, and Ba form compounds with P, S, Se, Te, and O; and thereby, it is possible to reliably exhibit the crystal grain growth suppressing effect (the effect of suppressing the growth of the crystal grains) of Ca, Sr, and Ba.

According to Aspect 12 of the present invention, in the pure copper material of any one of Aspects 1 to 11, one or more selected from Ag, Fe, and Pb may be included in a total amount of 50.0 mass ppm or less.

According to the pure copper material of Aspect 12 of the present invention, in a case where one or more selected from Ag, Fe, and Pb are included in a total amount of 0.5 mass ppm or more and 50.0 mass ppm or less, Ag, Fe, and Pb dissolve in the matrix of copper, and thus it is possible to further suppress the growth of the crystal grains during a heat treatment. In a case where the total amount of one or more selected from Ag, Fe, and Pb is 0 mass ppm or more and less than 0.5 mass ppm, the above-described effects are small.

According to Aspect 13 of the present invention, in the pure copper material of any one of Aspects 1 to 12, Mg may be contained in an amount of 100 mass ppm or less.

According to the pure copper material of Aspect 13 of the present invention, in a case where Mg is contained in an amount of 1 mass ppm or more and 100 mass ppm or less, it is possible to further suppress the growth of the crystal grains during a heat treatment. In a case where the amount of Mg is 0 mass ppm or more and less than 1 mass ppm, the above-described effects are small.

An insulating substrate of Aspect 14 of the present invention is an insulating substrate including: a ceramics substrate; and a copper sheet bonded to one surface of the ceramics substrate, in which the copper sheet is formed of the pure copper material of any one of Aspects 1 to 13.

According to the insulating substrate of Aspect 14 of the present invention, since the copper sheet bonded to the ceramics substrate is formed of the pure copper material of any one of Aspects 1 to 13, the growth of the crystal grains during bonding is suppressed, so that the copper sheet has a uniform crystal structure and can be stably used.

An electronic device of Aspect 15 of the present invention is an electronic device including: the insulating substrate of Aspect 14; and an electronic component mounted on the insulating substrate.

According to the electronic device of Aspect 15 of the present invention, since the insulating substrate of Aspect 14 is included, the copper sheet has a uniform crystal structure and can be stably used.

Advantageous Effects of Invention

According to the aspect of the present invention, it is possible to provide a pure copper material in which it is possible to obtain a uniform and fine crystal structure since a change in crystal grain size is small even after a heat treatment and a variation in crystal grain size is suppressed, an insulating substrate using this pure copper material, and an electronic device.

DETAILED DESCRIPTION OF THE INVENTION

Hereinafter, a pure copper material, an insulating substrate, and an electronic device according to an embodiment of the present invention will be described.

The pure copper material according to the present embodiment is used as a material of an electrical or electronic component such as a heatsink or a thick copper circuit, and when the above-described electrical or electronic component is formed, the pure copper material is bonded to, for example, a ceramics substrate to constitute an insulating substrate.

Figure 1:
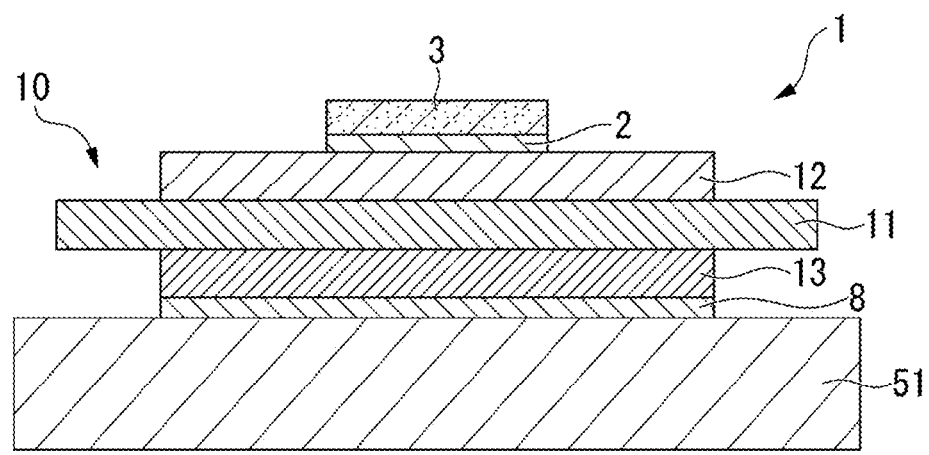
FIG. 1 is a schematic diagram explaining an insulating substrate and an electronic device according to the present embodiment.

FIG. 1 shows an insulating substrate 10 and an electronic device 1 using this insulating substrate 10 according to the embodiment of the present invention.

The electronic device 1 according to the present embodiment includes the insulating substrate 10 according to the present embodiment, an electronic component 3 bonded to one side (upper side in FIG. 1) of the insulating substrate 10 via a first bonding layer 2, and a heatsink 51 bonded to the other side (lower side in FIG. 1) of the insulating substrate 10 via a second bonding layer 8.

In the present embodiment, the electronic component 3 is a power semiconductor element, and the electronic device 1 is a power module.

The insulating substrate 10 includes a ceramics substrate 11, a circuit layer 12 provided on one surface (upper surface in FIG. 1) of the ceramics substrate 11, and a metal layer 13 provided on the other surface (lower surface in FIG. 1) of the ceramics substrate 11.

The ceramics substrate 11 prevents electrical connection between the circuit layer 12 and the metal layer 13.

The circuit layer 12 is formed by bonding a copper sheet to one surface of the ceramics substrate 11. The circuit layer 12 has a circuit pattern formed thereon, and one surface (upper surface in FIG. 1) thereof is a mounting surface on which the electronic component 3 is mounted.

The metal layer 13 is formed by bonding a copper sheet to the other surface of the ceramics substrate 11. The metal layer 13 acts to efficiently transfer the heat from the electronic component 3 to the heatsink 51.

The bonding between the copper sheet serving as the circuit layer 12 and the ceramics substrate 11 and the bonding between the copper sheet serving as the metal layer 13 and the ceramics substrate 11 are carried out by an existing bonding method such as a DBC method or an AMB method.

The temperature during the bonding is, for example, a high temperature condition of 750° C. or higher, and there is a concern that crystal grain coarsening may occur in the circuit layer 12 and the metal layer 13.

Therefore, in the present embodiment, each of the copper sheet serving as the circuit layer 12 and the copper sheet serving as the metal layer 13 is formed of the pure copper material according to the present embodiment.

In the pure copper material according to the present embodiment, the amount of Cu is in a range of 99.9 mass % or more and 99.999 mass % or less.

In the pure copper material according to the present embodiment, one or more additive elements selected from Ca, Sr, and Ba may be included in a total amount of 5 mass ppm or more and 300 mass ppm or less.

In addition, in the pure copper material according to the present embodiment, one or more selected from S, Se, and Te may be included in a total amount of 0.2 mass ppm or more and 10.0 mass ppm or less.

Furthermore, in the pure copper material according to the present embodiment, the amount of O is preferably 100 mass ppm or less.

In addition, in the pure copper material according to the present embodiment, the amount of P may be in a range of 0.01 mass ppm or more and 3.00 mass ppm or less.

Furthermore, in the pure copper material according to the present embodiment, a mass ratio A/B of a total amount A of Ca, Sr, and Ba to a total amount B of P, S, Se, Te, and O is preferably more than 1.0.

In addition, in the pure copper material according to the present embodiment, one or more selected from Ag, Fe, and Pb may be included in a total amount of 0.5 mass ppm or more and 50.0 mass ppm or less.

Furthermore, in the pure copper material according to the present embodiment, Mg may be contained in a range of 1 mass ppm or more and 100 mass ppm or less.

In the pure copper material according to the present embodiment, the average crystal grain size in a rolled surface is 10 μm or more, and when a measurement area of 1 mm$^2$ or more is measured by an EBSD method at a measurement interval of 1 μm, measurement points (pixels) at which the CI value obtained by an analysis using data analysis software OIM is 0.1 or less are excluded, and boundaries between adjacent pixels with a misorientation of 5° or more are regarded as crystal grain boundaries, an average of local orientation spread (LOS) is 2.00° or less.

In the present embodiment, the "misorientation" is also referred to as "angle difference".

In the pure copper material according to the present embodiment, when a measurement area of 1 mm$^2$ or more is measured by an EBSD method at a measurement interval of 1 μm, measurement points at which the CI value obtained by an analysis using data analysis software OIM is 0.1 or less are excluded, and boundaries between adjacent pixels with a misorientation of 5° or more are regarded as crystal grain boundaries, an average of grain orientation spread (GOS) is preferably 2.00° or less.

In addition, in the pure copper material according to the present embodiment, when a measurement area of 1 mm$^2$ or more is measured by an EBSD method at a measurement interval of 1 μm, measurement points at which the CI value obtained by an analysis using data analysis software OIM is 0.1 or less are excluded, and boundaries between adjacent pixels with a misorientation of 5° or more are regarded as crystal grain boundaries, a value of standard deviation of a kernel average misorientation (KAM) value is preferably 0.750 or less.

Furthermore, in the pure copper material according to the present embodiment, in a case where a measurement area of 1 mm$^2$ or more is measured by an EBSD method at a measurement interval of 1 μm, measurement points at which the CI value obtained by an analysis using data analysis software OIM is 0.1 or less are excluded, and boundaries between adjacent pixels with a misorientation of 5° or more are regarded as crystal grain boundaries, an average of geometrically necessary dislocations (GNDs) is preferably $5.0 \times 10^{14}$ m$^{-2}$ or less.

In addition, it is preferable that the pure copper material according to the present embodiment includes compounds containing at least one of the above-described additive elements and Cu and the number density of the compounds is $1 \times 10^{-4}$ pieces/μm$^2$ or more.

Furthermore, the above-described compounds preferably includes one or more selected from $Cu_5Ca$, $Cu_5Sr$, and $Cu_{13}Ba$.

The reasons why the amount of Cu, the average crystal grain size, the average of LOS, the average of GOS, the value of standard deviation of the KAM value, the average of GND, the amount of each of the various elements, and the compounds are specified as described above in the pure copper material according to the present embodiment will be described below.

(Amount of Cu: 99.9 Mass % or More and 99.999 Mass % or Less)

In electrical and electronic components for high-current uses, there is a demand for excellent conductive properties and heat radiation in order to suppress the generation of heat during electrical conduction, and pure copper that is particularly excellent in terms of conductive properties and heat radiation is preferably used. Further, in a case where the component is bonded to a ceramics substrate or the like, it is preferable that the deformation resistance is small so that the thermal strain generated during loading of a thermal cycle can be alleviated.

Therefore, in the pure copper material according to the present embodiment, the purity of Cu is specified as 99.9 mass % or higher. The purity of Cu is preferably 99.965 mass % or higher, and more preferably 99.97 mass % or higher.

In addition, in a case where the purity of Cu is higher than 99.999 mass %, a special refining step is required, and the production cost significantly increases. Therefore, in the pure copper material according to the present embodiment, the purity of Cu is specified as 99.999 mass % or lower.

(Average Crystal Grain Size in Rolled Surface: 10 μm or More)

In the pure copper material according to the present embodiment, when the grain sizes of crystal grains in a rolled surface are fine, recrystallization is likely to proceed during the heating of the pure copper material to, for example, 800° C. or higher, and there is a concern that crystal grain coarsening and microstructure nonuniformity may be promoted.

Therefore, in the pure copper material according to the present embodiment, the average crystal grain size in a rolled surface is set to be 10 μm or more in order to suppress the crystal grain coarsening and the microstructure nonuniformity during the heat treatment.

The average crystal grain size in the rolled surface is preferably 15 μm or more, and more preferably 20 μm or more. In addition, the average crystal grain size in the rolled surface is preferably 300 μm or less, more preferably 275 μm or less, and still more preferably 250 μm or less.

(Average of LOS: 2.000 or Less)

The local orientation spread (LOS) value measured by EBSD is calculated from angle differences between points inside a set kernel and all other points inside the kernel. For example, since the pixels have a regular hexagon shape, one center point has six adjacent points in a case where the degree of proximity is set to 1. In a case where any pair is selected from the total of seven points including the center point and the six adjacent points, the number of the pairs is 21. The misorientation between two points of each of the 21 combinations is measured, and the average thereof is defined as an LOS value. Furthermore, a value obtained by averaging the obtained LOS values over the measurement field of view is defined as an average of LOS. The LOS value is a value corresponding to the strain amount considering the misorientation between the pixels inside the set kernel. The LOS value is a measurement value having less dependence on the step size during the measurement.

In the present embodiment, with the degree of proximity set to 1, the calculation is performed on a target with an angle difference of 5° or less between the pixels. With the LOS value, the strain distribution in the crystal can be accurately evaluated.

In the present embodiment, the average of LOS is set to be 2.000 or less, so that a change in crystal grain size is small even after a heat treatment and a uniform and fine crystal structure can be obtained.

The average of LOS is preferably 1.75° or less, and more preferably 1.500 or less. In addition, the average of LOS is preferably 0.050 or more, more preferably 0.100 or more, and still more preferably 0.200 or more.

(Average of GOS: 2.000 or Less)

The grain orientation spread (GOS) value measured by EBSD is an average of angle differences between the crystal grains, obtained by measuring angle differences between all the pixels in the crystal grains. Furthermore, a value obtained by averaging the obtained GOS values over the measurement field of view is defined as an average of GOS. The average of GOS is calculated using the number of the crystals, not the sizes of the regions of the crystals. That is, large GOS values indicate that the strain existing in the crystal grains is localized. The calculation is performed on a target with an angle difference of 5° or less between the pixels.

By keeping the GOS value low, the strains are uniformly present, and thus the crystal grains uniformly grow. Therefore, it is possible to effectively suppress the local coarsening of the crystal grains. In addition, even after a heat treatment, a change in crystal grain size is further reduced, and it is possible to obtain a crystal structure that is more uniform and finer.

Therefore, in the present embodiment, in order to sufficiently suppress the local coarsening of the crystal grains during the heat treatment, the average of GOS is preferably set to be 2.000 or less.

The average of GOS is more preferably 1.900 or less, and still more preferably 1.80° or less. In addition, the average of GOS is preferably 0.050 or more, more preferably 0.100 or more, and still more preferably 0.200 or more.

(Value of Standard Deviation of KAM Value: 0.750 or Less)

The kernel average misorientation (KAM) value measured by EBSD is a value calculated by averaging the misorientations between one pixel and pixels surrounding the pixel. Since the pixels have a regular hexagon shape, in a case where the degree of proximity is set to 1, the average of the misorientations between one pixel and six adjacent pixels is calculated as the KAM value. By using the KAM value, the local misorientation, that is, the strain distribution can be visualized. The value of standard deviation of the KAM value indicates the uniformity of the local strain. The calculation is performed on a target with an angle difference of 5° or less between the pixels.

By keeping the value of standard deviation of the KAM value low, the strain is uniformly present, and thus the crystal grains uniformly grow. Therefore, it is possible to effectively suppress the local coarsening of the crystal grains. In addition, even after a heat treatment, a change in crystal grain size is further reduced, and it is possible to obtain a crystal structure that is more uniform and finer.

Therefore, in the present embodiment, in order to sufficiently suppress the local coarsening of the crystal grains during the heat treatment, the value of standard deviation of the KAM value is preferably set to 0.750 or less.

The value of standard deviation of the KAM value is more preferably 0.700 or less, and still more preferably 0.65° or less. In addition, the value of standard deviation of the KAM value is preferably 0.0250 or more, more preferably 0.050 or more, and still more preferably 0.0750 or more.

(Average of GND: $5.0 \times 10^{14}$ $m^{-2}$ or Less)

The value of geometrically necessary dislocations (GNDs) measured by EBSD is a value for evaluating the amount of GN dislocations by measurement of the orientations of the pixels. By using the GND value, the GN dislocations locally accumulated can be evaluated. $\{111\}<110>$ is used as a slip system, and the magnitude of the Burgers vector of 0.255 nm at that time is used for calculation. With the degree of proximity set to 1, the calculation is performed on a target with an angle difference of 5° or less between the pixels.

By keeping the average of GND low, the GN dislocations locally accumulated are reduced, and it is possible to further effectively suppress the growth of the crystal grains during a heat treatment.

Therefore, in the present embodiment, the average of GND is preferably set to be $5.0 \times 10^{14}$ $m^{-2}$ or less. Accordingly, crystal grain coarsening during the heat treatment can be further suppressed, a change in crystal grain size is further reduced even after the heat treatment, and it is possible to obtain a crystal structure that is more uniform and finer.

The average of GND is more preferably $4.5 \times 10^{14}$ $m^{-2}$ or less, and still more preferably $4.0 \times 10^{14}$ $m^{-2}$ or less. In addition, the average of GND is preferably $0.4 \times 10^{14}$ $m^{-2}$ or more, more preferably $0.6 \times 10^{14}$ $m^{-2}$ or more, and still more preferably $0.8 \times 10^{14}$ $m^{-2}$ or more.

(Total Amount of One or More Additive Elements Selected from Ca, Sr, and Ba: 5 Mass ppm or More and 300 Mass ppm or Less)

One or more additive elements selected from Ca, Sr, and Ba form compounds without substantially dissolving in the matrix of copper. In addition, since they are elements that are likely to be localized at the grain boundaries, the crystal grain boundaries can be pinned even with a small amount of these elements, and thus it is possible to effectively suppress the growth of the crystal grains during a heat treatment. Therefore, by adding one or more additive elements selected from Ca, Sr, and Ba, it is possible to further suppress the growth of the crystal grains during the heat treatment without a substantial change in material strength or electrical conductivity.

In addition, it has been found that the effects of the additive elements are enhanced by controlling the average of LOS described above at the same time. In a case where there is an additive element having a pinning effect when the recrystallized nuclei generated by the heat treatment grows, the growth of the recrystallized nuclei can be suppressed, and the state of the finer crystal grains can be maintained.

Meanwhile, in a case where the amount of one or more additive elements selected from Ca, Sr, and Ba is too large, there is a concern that the producibility may be adversely affected.

Therefore, in the present embodiment, in order to further suppress the growth of the crystal grains during the heat treatment, the total amount of one or more additive elements selected from Ca, Sr, and Ba is preferably set to be in a range of 5 mass ppm or more and 300 mass ppm or less.

The lower limit of the total amount of one or more additive elements selected from Ca, Sr, and Ba is more preferably 7.5 mass ppm or more, and still more preferably 10 mass ppm or more. In addition, the upper limit of the total amount of one or more additive elements selected from Ca, Sr, and Ba is more preferably 250 mass ppm or less, and still more preferably 200 mass ppm or less.

(Number Density of Compounds Containing at Least One of Additive Elements and Cu: $1 \times 10^{-4}$ Pieces/$\mu m^2$ or More)

In a case where a large amount of compounds containing at least one of Ca, Sr, Ba, and Cu is present, the crystal grain boundaries can be pinned, and thus it is possible to effectively suppress the growth of the crystal grains during a heat treatment.

Therefore, in the present embodiment, in order to further suppress the growth of the crystal grains during the heat treatment, the number density of the compounds containing at least one of the additive elements and Cu is preferably $1 \times 10^{-4}$ pieces/$\mu m^2$ or more.

The number density of the compounds containing at least one of the additive elements and Cu is more preferably $5 \times 10^{-4}$ pieces/$\mu m^2$ or more, and still more preferably $10 \times 10^{-4}$ pieces/$\mu m^2$ or more. In addition, the number density of the compounds containing at least one of the additive elements and Cu is preferably $1000 \times 10^{-4}$ pieces/$\mu m^2$ or less, more preferably $900 \times 10^{-4}$ pieces/$\mu m^2$ or less, and still more preferably $800 \times 10^{-4}$ pieces/$\mu m^2$ or less.

The compounds containing at least one of the additive elements and Cu preferably include one or more selected from $Cu_5Ca$, $Cu_5Sr$, and $Cu_{13}Ba$.

(Total Amount of One or More Selected from S, Se, and Te: 0.2 Mass ppm or More and 10.0 Mass ppm or Less)

Elements such as S, Se, and Te act to suppress the crystal grain coarsening by suppressing the migration of the crystal grain boundaries and degrade hot workability. In a case where the elements such as S, Se, and Te are contained in a large amount, there is a concern that the hot workability may degrade.

Therefore, in the present embodiment, in order to ensure the hot workability and more effectively suppress the crystal grain coarsening during a heat treatment, the total amount of one or more selected from S, Se, and Te is preferably set in a range of 0.2 mass ppm or more and 10.0 mass ppm or less.

The lower limit of the total amount of one or more selected from S, Se, and Te is preferably 0.5 mass ppm or more, and more preferably 2.0 mass ppm or more. In addition, the upper limit of the total amount of one or more selected from S, Se, and Te is preferably 7.5 mass ppm or less, and more preferably 5.0 mass ppm or less.

(Amount of O: 100 Mass ppm or Less)

O (oxygen) contained as an impurity in the pure copper material is an element having an effect of promoting the growth of the crystal grains.

Therefore, in the present embodiment, in order to further effectively suppress the growth of the crystal grains during a heat treatment, the amount of O is preferably limited to 100 mass ppm or less.

The amount of O is more preferably 75 mass ppm or less, and still more preferably 50 mass ppm or less. In addition, the amount of O is preferably 0.1 mass ppm or more, more preferably 0.3 mass ppm or more, and still more preferably 0.5 mass ppm or more.

(P: 0.01 Mass ppm or More and 3.00 Mass ppm or Less)

P is widely used as an element that neutralizes the oxygen in copper. However, in a case where P is contained in a certain amount or more, P impairs the effect of not only oxygen but also the crystal grain growth-suppressing element present at the crystal grain boundaries. Therefore, during heating at a high temperature, there is a concern that the crystal grain growth-suppressing element may not sufficiently act and the crystal grains may become coarsened and nonuniform.

Therefore, in the present embodiment, the amount of P is preferably set to be 0.01 mass ppm or more and 3.00 mass ppm or less.

The amount of P is preferably set to be 2.50 mass ppm or less, and more preferably 2.00 mass ppm or less.

(Mass Ratio A/B of Total Amount a of One or More Additive Elements Selected from Ca, Sr, and Ba to Total Amount B of P, S, Se, Te, and O: More than 1.0)

One or more additive elements selected from Ca, Sr, and Ba form compounds with elements such as P, S, Se, Te, and O. Therefore, in a case where large amounts of P, S, Se, Te, and O are present, there is a concern that the pinning effect may not act more effectively since the compounds containing one or more additive elements selected from Ca, Sr, and Ba and Cu is not sufficiently formed.

Therefore, in the present embodiment, the mass ratio A/B of the total amount A of one or more additive elements selected from Ca, Sr, and Ba to the total amount B of P, S, Se, Te, and O is preferably set to be more than 1.0.

The mass ratio A/B of the total amount A of one or more additive elements selected from Ca, Sr, and Ba to the total amount B of P, S, Se, Te, and O is more preferably 1.5 or more, and still more preferably 2.0 or more. In addition, the mass ratio A/B is preferably 100 or less, more preferably 75 or less, and still more preferably 50 or less.

(Total Amount of One or More Selected from Ag, Fe, and Pb: 0.5 Mass ppm or More and 50.0 Mass ppm or Less)

Ag, Fe, and Pb are elements acting to suppress the crystal grain coarsening by dissolving in the matrix of copper. Meanwhile, in a case where Ag, Fe, and Pb are contained in a large amount, there is a concern that the production cost may increase or the electrical conductivity may decrease.

Therefore, in the present embodiment, the total amount of one or more selected from Ag, Fe, and Pb is preferably set to be in a range of 0.5 mass ppm or more and 50.0 mass ppm or less.

The lower limit of the total amount of one or more selected from Ag, Fe, and Pb is more preferably 2.0 mass ppm or more, and still more preferably 5.0 mass ppm or more. Meanwhile, the upper limit of the total amount of one or more selected from Ag, Fe, and Pb is more preferably 40.0 mass ppm or less, and still more preferably 30.0 mass ppm or less.

(Mg: 1 Mass ppm or More and 100 Mass ppm or Less)

Mg is an element having an effect of suppressing the growth of the crystal grains. In a case where Mg is contained in a large amount, there is a concern that the productivity may be adversely affected.

Therefore, in the present embodiment, the amount of Mg is preferably set to be in a range of 1 mass ppm or more and 100 mass ppm or less.

The lower limit of the amount of Mg is more preferably 2 mass ppm or more, and still more preferably 3 mass ppm or more. The upper limit of the amount of Mg is more preferably 90 mass ppm or less, and still more preferably 80 mass ppm or less.

(Other Inevitable Impurities)

Examples of the inevitable impurities contained in the balance other than the above-described elements whose amounts are specified include Al, As, B, Be, Bi, Cd, Cr, Sc, rare earth elements, V, Nb, Ta, Mo, Ni, W, Mn, Re, Ru, Ti, Os, Co, Rh, Ir, Pd, Pt, Au, Zn, Zr, Hf, Hg, Ga, In, Ge, Y, Tl, N, Sb, Si, Sn, and Li. These inevitable impurities may be contained within a range not to affect the characteristics.

Since there is a concern that these inevitable impurities may decrease the electrical conductivity, the total amount of the inevitable impurities is preferably set to be 0.04 mass % or less, more preferably 0.03 mass % or less, still more preferably 0.02 mass % or less, and far still more preferably 0.01 mass % or less.

In addition, the upper limit of the amount of each of the inevitable impurities is preferably set to be 30 mass ppm or less, more preferably 20 mass ppm or less, and still more preferably 15 mass ppm or less.

Figure 2:
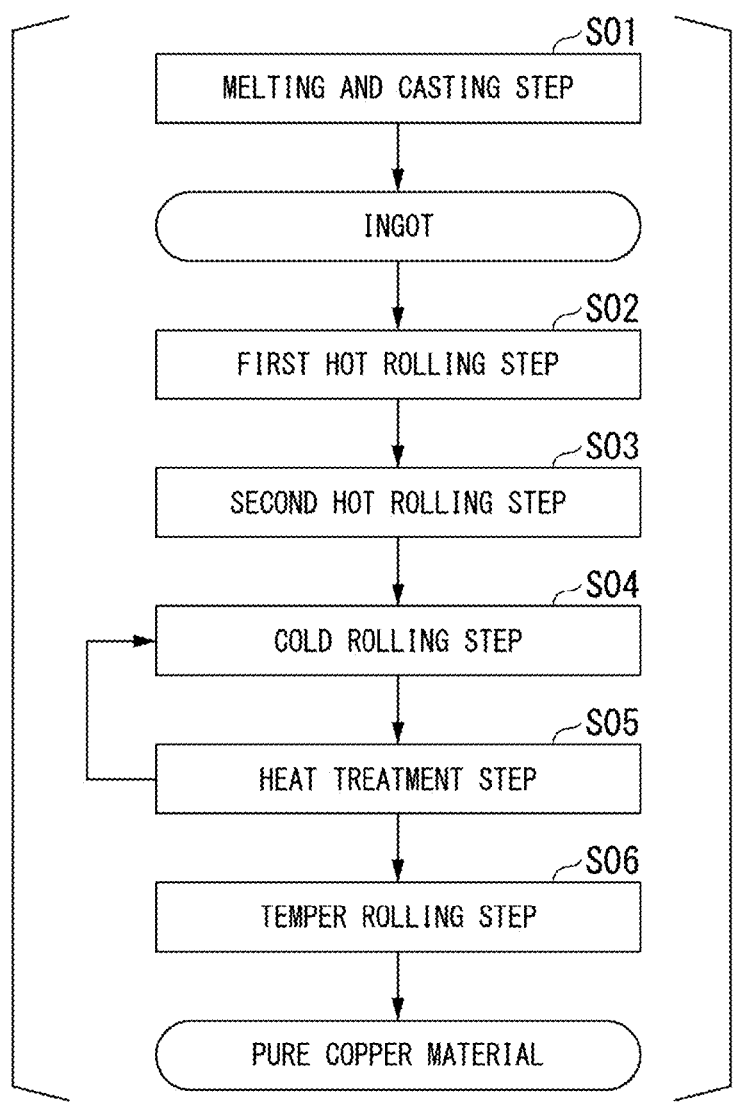
FIG. 2 is a flowchart of a method of producing a pure copper material according to the present embodiment.

Next, a method of producing the pure copper material according to the present embodiment with such a configuration will be described with reference to the flowchart shown in FIG. 2.

(Melting and Casting Step S01)

First, the above-described elements are added to molten copper obtained by melting an oxygen-free copper raw material to adjust components, and a molten copper alloy is produced. For the addition of various elements, a single element, a mother alloy, and the like can be used. In addition, raw materials containing the above-described elements may be melted together with the copper raw material. The molten copper is preferably so-called 4N Cu having a purity of 99.99 mass % or higher or so-called 5N Cu having a purity of 99.999 mass % or higher.

In the melting step, the melting is performed in an inert gas atmosphere (for example, Ar gas) with a low vapor pressure of $H_2O$ in order to decrease the hydrogen concentration, and the holding time during melting is preferably kept to the minimum. The molten copper alloy in which the components have been adjusted is poured into a mold to produce an ingot. In consideration of mass production, a continuous casting method or a semi-continuous casting method is preferably used.

(First Hot Rolling Step S02)

The obtained ingot is subjected to hot working to introduce strains and to deform the shape into a predetermined size. By introducing the strains, high strains can be imparted in a state in which the crystal grains are coarse, and thus it is possible to increase the uniformity of the material.

In a case where the hot rolling temperature is set to a high temperature of 650° C. or higher and the average reduction in one pass of rolling (average rolling ratio in one pass of rolling) is set to be 15% or more, the strains can be uniformly introduced at a high temperature, and thus a microstructure having high uniformity can be formed. The total rolling ratio in this step is preferably set to be 50% or more, more preferably 55% or more, and still more preferably 60% or more in order to break the cast structure.

(Second Hot Rolling Step S03)

In order to make the strains further uniform, the hot-rolled material obtained by the first hot rolling step S01 is reheated, and a second hot rolling step S02 is performed.

In a case where a high temperature condition of 650° C. or higher, which is the same as or higher than in the first hot rolling step S02, is set, and the average reduction in one pass of rolling (average rolling ratio in one pass of rolling) is set to be 15% or more in the second hot rolling step S03, a microstructure having high uniformity can be formed. The total rolling ratio in this step is preferably set to be 50% or more, more preferably 55% or more, and still more preferably 60% or more in order to break the cast structure.

(Cold Rolling Step S04)

Next, the copper material after the second hot rolling step S03 is subjected to cold rolling to be worked into a predetermined shape.

The temperature condition in the cold rolling step S04 is not particularly limited, but the cold rolling step is preferably performed in a range of −200° C. or higher and 200° C. or lower. In the cold rolling step S04, it is necessary to perform rolling having a high reduction (rolling ratio) of 15% or more per pass in order to introduce uniform strains to the entire material. In the cold rolling step S04, cold working is performed. Therefore, in a case where the working is performed at a low reduction, the frictional force with a material surface is strong, and the strains are preferentially introduced to the surface in a thickness direction and the crystals having an orientation in which strains are likely to be introduced; and thereby, microstructure nonuniformity is caused. Therefore, the rolling is required to be performed at a high reduction in order to increase the stress element of compression. It is necessary to obtain a predetermined shape by performing the high-reduction rolling a plurality of times. In addition, the total working ratio is preferably 15% or more, and more preferably 50% or more.

(Heat Treatment Step S05)

Next, the copper material after the cold rolling step S04 is heat-treated. The heat treatment method is not particularly limited, but may be performed in a non-oxidizing or reducing atmosphere. It is preferable that the heat treatment temperature be set to a high temperature of 750° C. or higher, and the heat treatment be performed at the temperature for a short time of 1 hour or shorter. In addition, the rate of temperature increase up to the heat treatment temperature is preferably set to be 100° C./min or more.

In a case where the uniformly introduced strains are subjected to the high-temperature heat treatment for a short time, recrystallization proceeds uniformly from each of recrystallization nuclei at the same time. In a case of a heat treatment at a low temperature condition of less than 750° C. or a heat treatment at a rate of temperature increase of less than 100° C./min, a variation is caused in the growth of the recrystallization nuclei, and as a result, a nonuniform structure is formed.

The cooling method is not particularly limited, but a method in which the cooling rate is 200° C./min or more, such as water quenching, is preferable.

In addition, the cold rolling step S04 and the heat treatment step S05 may be repeated two or more times for the uniformity of the recrystallized structure.

(Temper Rolling Step S06)

The copper material after the heat treatment step S05 may be subjected to temper rolling in order to adjust the material strength. In a case where a low material strength is required, the temper rolling may not be performed.

In a case where the rolling is performed, in order to uniformly introduce the strains of the rolling, the strains are required to be introduced in one pass in the rolling. In a case where the rolling is performed at a rolling ratio of more than 20%, microstructure nonuniformity occurs. Therefore, the rolling ratio is preferably set to be 20% or less.

The final thickness is not particularly limited, but is preferably set to be in a range of, for example, 0.5 mm or more and 5 mm or less.

The pure copper material (pure copper sheet) according to the present embodiment is produced through the above-described steps.

According to the pure copper material according to the present embodiment having the above-described configuration, since the amount of Cu is in a range of 99.9 mass % or more and 99.999 mass % or less, the pure copper material has particularly excellent conductive properties and heat radiation, and is particularly suitable as a material of a component for electronic and electrical devices for high-current uses.

In addition, in the pure copper material according to the present embodiment, since the average crystal grain size in the rolled surface is 10 μm or more, it is possible to suppress the proceeding of recrystallization during a heat treatment and it is possible to suppress the growth of the crystal grains and microstructure nonuniformity.

In the pure copper material according to the present embodiment, since the average of LOS measured by an EBSD method is 2.000 or less, the strain distribution in the crystals is uniformized, a change in crystal grain size is small even after a heat treatment, and a variation in crystal grain size is suppressed; and thereby, it is possible to obtain a uniform and fine microstructure.

Technical solutions for obtaining a microstructure having high uniformity are not limited to a specific method, but for example, the average reductions of the first hot rolling step, the second hot rolling step, and the cold rolling step, and the heat treatment temperature and the rate of temperature increase of the heat treatment step can be controlled as described above.

In the pure copper material according to the present embodiment, when a measurement area of 1 mm$^2$ or more is measured by an EBSD method at a measurement interval of 1 μm, measurement points at which the CI value obtained by an analysis using data analysis software OIM is 0.1 or less are excluded, and boundaries between adjacent pixels with a misorientation of 5° or more are regarded as crystal grain boundaries, an average of grain orientation spread (GOS) is 2.00° or less. In this case, the strains are not localized in the crystal grains, a change in crystal grain size is further reduced even after a heat treatment, and it is possible to obtain a microstructure that is more uniform and finer.

In addition, in the pure copper material according to the present embodiment, when a measurement area of 1 mm$^2$ or more is measured by an EBSD method at a measurement interval of 1 μm, measurement points at which the CI value obtained by an analysis using data analysis software OIM is 0.1 or less are excluded, and boundaries between adjacent pixels with a misorientation of 5° or more are regarded as crystal grain boundaries, a value of standard deviation of a kernel average misorientation (KAM) value is 0.75° or less. In this case, the strains are not localized in the crystal grains, a change in crystal grain size is further reduced even after a heat treatment, and it is possible to obtain a microstructure that is more uniform and finer.

Furthermore, in the pure copper material according to the present embodiment, when a measurement area of 1 mm$^2$ or more is measured by an EBSD method at a measurement interval of 1 μm, measurement points at which the CI value obtained by an analysis using data analysis software OIM is 0.1 or less are excluded, and boundaries between adjacent pixels with a misorientation of 5° or more are regarded as crystal grain boundaries, an average of geometrically necessary dislocations (GNDs) is $5.0 \times 10^{14}$ m$^{-2}$ or less. In this case, the amount of GN dislocations locally accumulated is kept small. Therefore, a change in crystal grain size is further reduced even after a heat treatment, and it is possible to obtain a microstructure that is more uniform and finer.

In addition, in the pure copper material according to the present embodiment, in a case where one or more additive elements selected from Ca, Sr, and Ba are included in a total amount of 5 mass ppm or more and 300 mass ppm or less, the growth of the crystal grains can be suppressed by the one or more additive elements selected from Ca, Sr, and Ba, and thus it is possible to more reliably suppress the growth of the crystal grains during a heat treatment without significantly affecting the material strength and the electrical conductivity.

Furthermore, in the pure copper material according to the present embodiment, in a case where compounds containing at least one of Ca, Sr, Ba, and Cu are contained and the number density of the compounds is $1 \times 10^{-4}$ pieces/μm$^2$ or more, it is possible to more reliably suppress the growth of the crystal grains during a heat treatment by the pinning effect of these compounds.

Furthermore, in the pure copper material according to the present embodiment, in a case where the compounds containing at least one of Ca, Sr, Ba, and Cu include one or more selected from Cu$_5$Ca, Cu$_5$Sr, and Cu$_{13}$Ba, it is possible to more reliably suppress the growth of the crystal grains during a heat treatment by the pinning effect of these compounds.

Furthermore, in the pure copper material according to the present embodiment, in a case where one or more selected from S, Se, and Te are included in a total amount of 0.2 mass ppm or more and 10.0 mass ppm or less, it is possible to suppress the migration of the crystal grain boundaries without significantly degrading the hot workability, and it is possible to more reliably suppress the growth of the crystal grains during a heat treatment.

In addition, in the pure copper material according to the present embodiment, in a case where the amount of O is 100 mass ppm or less, the amount of O, which is an element that promotes the growth of the crystal grains, is sufficiently suppressed, and the growth of the crystal grains during a heat treatment can be further suppressed.

Furthermore, in the pure copper material according to the present embodiment, in a case where the amount of P is in a range of 0.01 mass ppm or more and 3.00 mass ppm or less, O, which promotes the growth of the crystal grains, can be neutralized, and the prevention of the effect of the crystal grain growth-suppressing element present at the crystal grain boundaries can be suppressed.

In addition, in the pure copper material according to the present embodiment, in a case where the mass ratio A/B of the total amount A of Ca, Sr, and Ba to the total amount B of P, S, Se, Te, and O is more than 1.0, it is possible to suppress the consumption of Ca, Sr, and Ba in which Ca, Sr, and Ba form compounds with P, S, Se, Te, and O; and thereby, it is possible to reliably exhibit the crystal grain growth suppressing effect of Ca, Sr, and Ba.

Furthermore, in the pure copper material according to the present embodiment, in a case where one or more selected from Ag, Fe, and Pb are included in a total amount of 0.5 mass ppm or more and 50.0 mass ppm or less, Ag, Fe, and Pb dissolve in the matrix of copper, and thus it is possible to further suppress the growth of the crystal grains during a heat treatment.

In addition, in the pure copper material according to the present embodiment, in a case where Mg is contained in an amount of 1 mass ppm or more and 100 mass ppm or less, it is possible to further suppress the crystal grain coarsening after a heat treatment by the crystal grain growth suppressing effect of Mg.

The insulating substrate 10 according to the present embodiment includes the ceramics substrate 11, the circuit layer 12 bonded to one surface of the ceramics substrate 11, and the metal layer 13 bonded to the other surface of the ceramics substrate 11, and the copper sheets serving as the circuit layer 12 and the metal layer 13 are each formed of the pure copper material according to the present embodiment. Accordingly, the growth of the crystal grains during bonding to the ceramics substrate 11 is suppressed, and a variation in crystal grain size is suppressed, so that the copper sheets have a uniform crystal structure and it can be stably used.

Since the electronic device 1 according to the present embodiment includes the above-described insulating substrate 10 and the electronic component 3 mounted on the circuit layer 12 of the insulating substrate 10, and the copper sheets serving as the circuit layer 12 and the metal layer 13 have a uniform crystal structure and it can be stably used.

Hereinbefore, the pure copper material according to the embodiment of the present invention has been described, but the present invention is not limited thereto and can be appropriately modified without departing from the technical features of the present invention.

For example, in the above-described embodiment, an example of the method of producing the pure copper material has been described, but the method of producing the pure copper material is not limited to the producing method described in the embodiment, and the pure copper material may be produced by appropriately selecting an existing producing method.

In addition, the above-described producing method has a rolling step, and the pure copper material according to the present embodiment can also be referred to as a pure copper rolled material.

Examples

Hereinafter, results of confirmation experiments performed to confirm the effects of the present invention will be described.

Pure copper having a purity of 99.999 mass % or higher was obtained by refining the amount of P to 0.001 mass ppm or less by zone melting refining method. A raw material consisting of the pure copper was put into a high-purity graphite crucible and melted by high-frequency induction heating in a furnace having an Ar gas atmosphere.

A mother alloy containing 1 mass % of various elements was produced by using 6N (purity of 99.9999 mass % or higher) high-purity copper and 2N (purity of 99 mass % or higher) elements. The mother alloy was added to the obtained molten copper to prepare molten copper alloys having component compositions shown in Tables 1 and 2. The obtained molten copper alloy was poured into a graphite mold to produce an ingot.

The ingot had a size of about 100 mm in thickness×about 100 mm in width×about 150 to 200 mm in length.

The obtained ingot was heated at 900° C. for 4 hours in an Ar gas atmosphere, left in the air to achieve final pass temperature conditions shown in Tables 3 and 4, and subjected to a first hot rolling step. The final pass temperature in the first hot rolling step was measured with a radiation thermometer. After the first hot rolling was finished, water cooling was performed.

Next, the resulting material was heated again at 900° C. for 4 hours in an Ar gas atmosphere, left in the air to achieve final pass temperature conditions shown in Tables 3 and 4, and subjected to a second hot rolling step. The final pass temperature in the second cold rolling step was measured with a radiation thermometer. Water cooling was also performed after the second hot rolling was finished.

Next, surface grinding was performed to remove an oxide film generated in the first hot rolling step and the second hot rolling step, and cutting into a predetermined size was performed. Thereafter, the thickness was appropriately adjusted to be a final thickness, and cutting was performed.

Each of the cut copper materials after the hot rolling was subjected to rough processing (cold rolling) and a heat treatment under conditions shown in Tables 3 and 4. A salt bath was used for the heat treatment, and it was confirmed that the heating rate (rate of temperature increase) was 100° C./min or higher. Thereafter, temper rolling was performed under conditions shown in Tables 3 and 4 to produce strip materials (pure copper materials) for characteristic evaluation having a thickness of 0.8 mm and a width of about 100 mm.

In addition, evaluation was performed regarding the following items.

(Composition Analysis)

A measurement specimen was collected from the obtained ingot. The amount of S and the amount of O were measured by an infrared absorption method, and the amounts of other elements were measured using a glow discharge mass spectrometer (GD-MS). It should be noted that the measurement was performed at two sites, the central portion of the specimen and an end portion in the width direction, and a larger amount was regarded as the amount of the sample.

(Average Crystal Grain Size)

A 20 mm×20 mm sample was cut out from the obtained strip material for characteristic evaluation, and the average crystal grain size was measured by an electron backscatter diffraction patterns (SEM-EBSD) measuring device. Conditions of the electron microscope and conditions of the EBSD detector are shown below.

(Conditions of Electron Microscope)
  Magnification for observation or area of measurement field: 400 μm×800 μm
  Acceleration voltage: 20 kV
  Working distance: 20 mm
  Specimen inclination angle: 70°
(Conditions of EBSD Detector)
  Analysis software name: OIM Data Analysis ver. 8.6 manufactured by EDAX/TSL (currently AMETEK, Inc.)
  CI value (confidence coefficient): Measurement points at which a CI value was more than 0.1 were used for analysis.
  Grain boundary angle difference: Boundaries with an angle difference of 5° or more were regarded as grain boundaries.
  Minimum grain size: Crystal grains of 2 steps or more were regarded as crystal grains.
Step Size: 1 μm
  Treatment of twin crystals: Twin crystals were regarded as grain boundaries.

The rolled surface was mechanically polished using waterproof abrasive paper and diamond abrasive grains. Next, finish polishing was performed using a colloidal silica solution. After that, using an electron scanning microscope, individual measurement points (pixels) in a measurement range on the specimen surface were irradiated with electron beams, and boundaries between measurement points at which a misorientation between adjacent measurement points obtained by orientation analysis using an electron backscatter diffraction method was 5° or more were defined as crystal grain boundaries. Boundaries between adjacent measurement points with a misorientation of 5° or more and less than 15° were defined as low-angle grain boundaries. Boundaries between adjacent measurement points with a misorientation of 15° or more were defined as high-angle grain boundaries. Twin boundaries were also defined as high-angle grain boundaries. Further, the measurement range was adjusted to contain 100 or more crystal grains in each sample. A crystal grain boundary map was created using the high-angle grain boundaries based on the obtained orientation analysis results. Five line segments having a predetermined length were drawn at predetermined intervals in each of the longitudinal direction and the transverse direction on the crystal grain boundary map in conformity with the cutting method of JIS H 0501. The number of crystal grains that were completely cut was counted, and the average of the cut lengths was calculated as an average crystal grain size.

(Average of LOS)

A sample of 20 mm×20 mm was cut out from the strip material for characteristic evaluation, and the rolled surface was mechanically polished using waterproof abrasive paper and diamond abrasive grains. Next, finish polishing was performed using a colloidal silica solution. Then, the rolled surface (observation surface) of the specimen was measured in a measurement area of 1 mm² or more at a measurement interval of 1 µm and an electron beam acceleration voltage of 15 kV by an EBSD method using an EBSD measuring device (Quanta FEG 450, manufactured by FEI, OIM Data Collection, manufactured by EDAX/TSL (currently AMETEK, Inc.)) and analysis software (OIM Data Analysis ver. 8.6, manufactured by EDAX/TSL (currently AMETEK, Inc.)). Conditions of the electron microscope other than the electron beam acceleration voltage and conditions of the EBSD detector were the same as the conditions in the measurement of the average crystal grain size described above. The measurement results were analyzed by the data analysis software OIM to obtain a confidence index (CI) value at each measurement point. The measurement points at which a CI value was 0.1 or less were exclude, and the misorientation between crystal grains was analyzed by the data analysis software OIM. Boundaries between adjacent pixels with a misorientation of 5° or more were regarded as crystal grain boundaries for analysis, and LOS values of all the pixels were obtained. The degree of proximity was set to 1, and the misorientation between each pair of seven points consisting of a center point and six adjacent points was obtained, and an average thereof was obtained and defined as an LOS value. An average (number average) of LOS values in the measurement region was obtained, and listed in Tables 5 and 6 as an average of LOS.

(Average of GOS)

Using the same specimen and the same device as those used for the LOS evaluation, the rolled surface (observation surface) of the specimen was measured in a measurement area of 1 mm² or more at a measurement interval of 1 µm and an electron beam acceleration voltage of 15 kV by an EBSD method. Conditions of the electron microscope other than the electron beam acceleration voltage and conditions of the EBSD detector were the same as the conditions in the measurement of the average crystal grain size described above. The measurement points at which a CI value was 0.1 or less were exclude, and the misorientation between crystal grains was analyzed by the data analysis software OIM. Boundaries between adjacent pixels with a misorientation of 5° or more were regarded as crystal grain boundaries for analysis, and GOS values of all the crystal grains were obtained. The total value thereof was divided by the number of crystal grains to obtain an average of GOS.

(Value of Standard Deviation of KAM Value)

Using the same specimen and the same device as those used for the LOS evaluation, the rolled surface (observation surface) of the specimen was measured in a measurement area of 1 mm² or more at a measurement interval of 1 µm and an electron beam acceleration voltage of 15 kV by an EBSD method. Conditions of the electron microscope other than the electron beam acceleration voltage and conditions of the EBSD detector were the same as the conditions in the measurement of the average crystal grain size described above. The measurement points at which a CI value was 0.1 or less were exclude, and the misorientation between crystal grains was analyzed by the data analysis software OIM. The degree of proximity was set to 1, and boundaries between adjacent pixels with a misorientation of 5° or more were regarded as crystal grain boundaries for analysis, and KAM values of all the pixels were obtained. Then, the value of standard deviation of the KAM value was obtained.

(Average of GND)

Using the same specimen and the same device as those used for the LOS evaluation, the rolled surface (observation surface) of the specimen was measured in a measurement area of 1 mm² or more at a measurement interval of 1 µm and an electron beam acceleration voltage of 15 kV by an EBSD method. Conditions of the electron microscope other than the electron beam acceleration voltage and conditions of the EBSD detector were the same as the conditions in the measurement of the average crystal grain size described above. The measurement points at which a CI value was 0.1 or less were exclude, and the misorientation between crystal grains was analyzed by the data analysis software OIM. Boundaries between adjacent pixels with a misorientation of 5° or more were regarded as crystal grain boundaries for analysis, and GND values of all the pixels and an average thereof were obtained. The slip system was $\{111\}<110>$, and the magnitude of the Burgers vector of 0.255 nm was adopted with respect to the <1-10> direction of the FCC (111) plane to calculate the GN dislocation density. In addition, in order to reduce error factors, the upper limit of the value of GND was set to $1.0\times10^{16}$ m$^{-2}$ and the average (number average) was calculated in regions of values equal to or less than the upper limit.

(Number Density of Compounds)

A measurement specimen was collected from the strip material for characteristic evaluation, and the rolled surface was subjected to CP polishing. 50 regions were observed using a field emission scanning electron microscope (FE-SEM) with a field of view of 2000 times magnification (about 2500 µm²/field of view). The number density of the compounds containing at least one of Ca, Sr, Ba, and Cu was calculated from the observation results in the 50 regions.

(Identification of Compound)

A sample for compound observation was produced from the strip material for characteristic evaluation using a focused ion beam (FIB) method. Grains were observed in the sample using a transmission electron microscope (TEM: manufactured by JEOL Ltd., JEM-2010F), and EDX analysis (energy dispersive X-ray spectroscopy) was performed to confirm whether the compound was a particle containing one or more elements selected from Ca, Sr, Ba, and Cu or not.

In addition, the observed compound was subjected to EDX analysis and electron diffraction analysis to confirm whether the compound contained one or more selected from $Cu_5Ca$ (space group P6/mmm (191)), $Cu_5Sr$ (space group P6/mmm (191)), and $Cu_{13}Ba$ (Fm-3c (226)) or not.

Figure 3A:
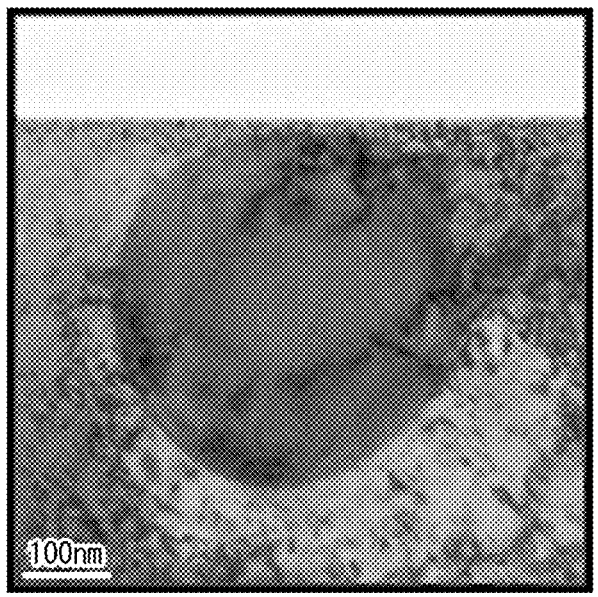
FIG. 3A is an observation result of compound in Invention Example 11, which is a transmission electron image (TEM image).
Figure 3B:
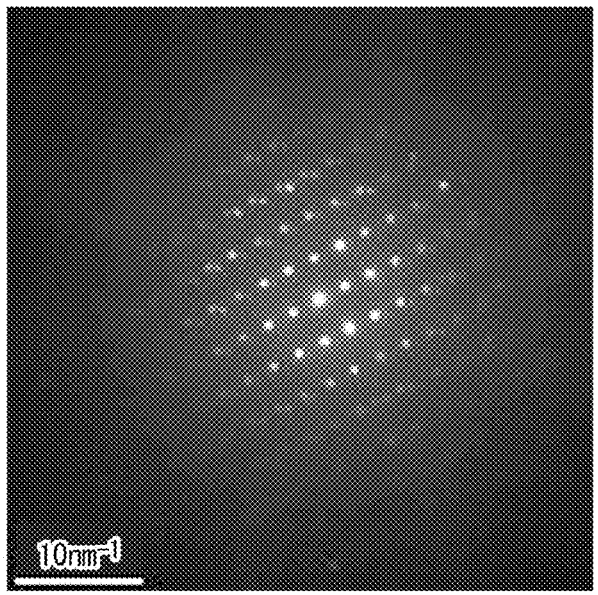
FIG. 3B is an observation result of the compound in Invention Example 11, which is an electron beam diffraction image.

FIGS. 3A and 3B show observation results of the compound in Invention Example 11. It was confirmed that the observed compound contained $Cu_5Ca$.

In the column of "Presence or Absence of Compounds" in the tables, cases where compounds containing one or more selected from $Cu_5Ca$, $Cu_5Sr$, and $Cu_{13}Ba$ were observed as a result of the above-described observation were indicated as "B" (present), and cases where the compounds were not observed were indicated as "D" (absent).

(Crystal Grain Size $d_{ave}$ after Pressure-Heat Treatment)

A sample of 40 mm×40 mm was cut out from the above-described strip material for characteristic evaluation. A paste-like active silver brazing material (TB-608T manufactured by Tokyo Braze Co., Ltd.) was applied to both surfaces of a ceramics sheet (material: $Si_3N_4$, 50 mm×50 mm×0.32 mm in thickness). The ceramics sheet was interposed between the two samples (pure copper sheets) described above, and then heat-treated in a state in which a load of a pressing pressure of 0.59 MPa was applied. The heat treatment was performed under the following conditions. The laminated pure copper sheets and the ceramics sheet were put into a furnace at 850° C., and the laminate was held for 60 minutes after confirming that the material temperature had reached 850° C. by a thermocouple. Then, furnace cooling (cooling in the furnace) was performed until the temperature reached the room temperature after the heating was finished. After the temperature was lowered to the room temperature, an average crystal grain size $d_{ave}$ in the rolled surface of the pure copper sheet was measured by the following method.

First, the rolled surface (the surface that was not in contact with the ceramics sheet) was mechanically polished using waterproof abrasive paper and diamond abrasive grains. Next, finish polishing was performed using a colloidal silica solution. Thereafter, the rolled surface (observation surface) was etched and observed with an optical microscope. Five line segments having a predetermined length were drawn at predetermined intervals in each of the longitudinal direction and the transverse direction in conformity with the cutting method of JIS H 0501. The number of crystal grains that were completely cut was counted, and the average of the cut lengths was defined as an average crystal grain size. Cases where the average crystal grain size was 200 μm or less were indicated as "A" (excellent). Cases where the average crystal grain size was more than 200 μm and 300 μm or less were indicated as "B" (good). Cases where the average crystal grain size was more than 300 μm and 500 μm or less were indicated as "C" (fair). Cases where the average crystal grain size was more than 500 μm were indicated as "D" (poor).

(Variation in Grain Size after Pressure-Heat Treatment)

As described above, within the range of the test piece of 40 mm×40 mm that had been subjected to the pressure-heat treatment, an average of lengths of the major axis and the minor axis of the largest crystal grain, excluding the twin crystals, was defined as a maximum crystal grain size $d_{max}$. Among the line segments drawn on the largest crystal grain, the maximum value of the length of the line segment cut by the grain boundary was defined as the major axis. Among the line segments perpendicular to the major axis, the the minor axis. Cases where a ratio $d_{max}/d_{ave}$ of the maximum crystal grain size $d_{max}$ to the average crystal grain size $d_{ave}$ described above was 15 or less were evaluated as "B" (good), cases where $d_{max}/d_{ave}$ was more than 15 and 20 or less were evaluated as "C" (fair), and cases where $d_{max}/d_{ave}$ was more than 20 were evaluated as "D" (poor).

TABLE 1

| | | Component Composition (mass ratio) | | | | | | | |
|---|---|---|---|---|---|---|---|---|---|
| | | Cu (%) | Ca (ppm) | Sr (ppm) | Ba (ppm) | A Ca + Sr + Ba (ppm) | S (ppm) | Se (ppm) | Te (ppm) | S + Se + Te (ppm) |
| Invention Examples | 1 | 99.96 or more | 0.00 | 0.00 | 0.00 | 0.00 | 3.00 | 0.20 | 0.20 | 3.40 |
| | 2 | 99.96 or more | 0.00 | 0.00 | 0.00 | 0.00 | 3.00 | 0.10 | 0.10 | 3.20 |
| | 3 | 99.96 or more | 0.00 | 0.00 | 0.00 | 0.00 | 4.00 | 0.20 | 0.09 | 4.29 |
| | 4 | 99.96 or more | 0.00 | 0.00 | 0.00 | 0.00 | 4.00 | 0.10 | 0.10 | 4.20 |
| | 5 | 99.96 or more | 15.00 | 0.00 | 0.00 | 15.00 | 4.00 | 0.20 | 0.10 | 4.30 |
| | 6 | 99.96 or more | 100.00 | 0.02 | 0.00 | 100.02 | 4.00 | 0.30 | 0.09 | 4.39 |
| | 7 | 99.96 or more | 280.00 | 0.03 | 0.01 | 280.40 | 4.00 | 0.50 | 0.10 | 4.60 |
| | 8 | 99.96 or more | 275.00 | 0.03 | 0.00 | 275.03 | 0.10 | 0.01 | 0.00 | 0.11 |
| | 9 | 99.96 or more | 0.00 | 0.00 | 0.00 | 0.00 | 3.00 | 0.10 | 0.20 | 3.30 |

TABLE 1-continued

|  |  | Cu (%) | Ca (ppm) | Sr (ppm) | Ba (ppm) | A Ca + Sr + Ba (ppm) | S (ppm) | Se (ppm) | Te (ppm) | S + Se + Te (ppm) |
|---|---|---|---|---|---|---|---|---|---|---|
|  | 10 | 99.96 or more | 5.00 | 0.00 | 0.00 | 5.00 | 2.00 | 0.23 | 0.16 | 2.39 |
|  | 11 | 99.96 or more | 25.00 | 0.00 | 0.00 | 25.00 | 3.00 | 0.24 | 0.18 | 3.42 |
|  | 12 | 99.96 or more | 35.00 | 0.01 | 0.00 | 35.01 | 3.00 | 0.17 | 0.18 | 3.35 |
|  | 13 | 99.96 or more | 50.00 | 0.01 | 0.00 | 50.01 | 3.00 | 0.16 | 0.11 | 3.27 |
|  | 14 | 99.96 or more | 100.00 | 0.01 | 0.00 | 100.01 | 4.00 | 0.17 | 0.15 | 4.32 |
|  | 15 | 99.96 or more | 240.00 | 0.03 | 0.01 | 24.04 | 9.50 | 0.24 | 0.13 | 9.87 |

| | | Component Composition (mass ratio) | | | | | | | | |
|---|---|---|---|---|---|---|---|---|---|---|
|  |  | O (ppm) | P (ppm) | Ag (ppm) | Fe (ppm) | Pb (ppm) | Ag + Fe + Pb (ppm) | Mg (ppm) | B P + S + Se + Te + O (ppm) | A/B |
| Invention Examples | 1 | 2.00 | 0.05 | 9.00 | 0.10 | 0.05 | 9.15 | 0.00 | 5.45 | 0.0 |
|  | 2 | 2.00 | 0.04 | 10.00 | 0.20 | 0.05 | 10.25 | 0.00 | 5.24 | 0.0 |
|  | 3 | 3.00 | 0.10 | 8.00 | 2.20 | 0.10 | 10.30 | 0.02 | 7.39 | 0.0 |
|  | 4 | 3.00 | 0.10 | 8.00 | 0.30 | 0.15 | 8.45 | 0.02 | 7.30 | 0.0 |
|  | 5 | 3.00 | 0.50 | 8.00 | 0.20 | 0.13 | 8.33 | 0.02 | 7.80 | 1.9 |
|  | 6 | 3.00 | 0.10 | 0.02 | 0.01 | 0.01 | 0.04 | 0.02 | 7.49 | 13.4 |
|  | 7 | 2.00 | 0.10 | 9.00 | 0.03 | 0.05 | 9.08 | 0.10 | 6.70 | 41.8 |
|  | 8 | 2.00 | 0.10 | 9.00 | 0.10 | 0.20 | 9.30 | 0.10 | 2.21 | 124.4 |
|  | 9 | 2.00 | 0.05 | 9.00 | 0.50 | 0.80 | 10.30 | 0.00 | 5.35 | 0.0 |
|  | 10 | 3.00 | 0.20 | 7.00 | 1.50 | 0.05 | 8.55 | 0.00 | 5.59 | 0.9 |
|  | 11 | 2.00 | 0.10 | 10.00 | 0.20 | 0.04 | 10.24 | 0.00 | 5.52 | 4.5 |
|  | 12 | 4.00 | 0.00 | 9.00 | 0.50 | 0.06 | 9.56 | 1.00 | 7.35 | 4.8 |
|  | 13 | 3.00 | 0.10 | 10.00 | 0.30 | 0.04 | 10.34 | 5.00 | 6.37 | 7.9 |
|  | 14 | 5.00 | 2.80 | 4.50 | 0.20 | 0.06 | 4.76 | 2.00 | 12.12 | 8.3 |
|  | 15 | 89.00 | 2.20 | 15.00 | 0.10 | 0.05 | 15.15 | 5.00 | 101.07 | 2.4 |

TABLE 2

| | | Component Composition (mass ratio) | | | | | | | | |
|---|---|---|---|---|---|---|---|---|---|---|
|  |  | Cu (%) | Ca (ppm) | Sr (ppm) | Ba (ppm) | A Ca + Sr + Ba (ppm) | S (ppm) | Se (ppm) | Te (ppm) | S + Se + Te (ppm) |
| Invention Examples | 16 | 99.96 or more | 0.00 | 15.00 | 0.00 | 15.00 | 0.20 | 0.10 | 0.18 | 0.48 |
|  | 17 | 99.96 or more | 0.00 | 30.00 | 0.00 | 30.00 | 3.00 | 0.22 | 0.12 | 3.34 |
|  | 18 | 99.96 or more | 0.00 | 50.00 | 0.00 | 50.00 | 3.00 | 0.24 | 0.19 | 3.43 |
|  | 19 | 99.96 or more | 0.00 | 95.00 | 0.00 | 95.00 | 4.00 | 0.19 | 0.16 | 4.35 |
|  | 20 | 99.96 or more | 0.00 | 0.00 | 13.00 | 13.00 | 2.00 | 0.18 | 0.16 | 2.34 |
|  | 21 | 99.96 or more | 55.00 | 0.00 | 28.00 | 83.00 | 3.00 | 0.18 | 0.18 | 3.36 |
|  | 22 | 99.96 or more | 0.00 | 0.00 | 47.00 | 47.00 | 4.00 | 0.18 | 0.18 | 4.36 |
|  | 23 | 99.96 or more | 0.00 | 0.00 | 88.00 | 88.00 | 4.00 | 0.19 | 0.13 | 4.32 |
|  | 24 | 99.96 or more | 0.00 | 0.01 | 120.00 | 120.01 | 8.00 | 0.22 | 0.18 | 8.40 |
|  | 25 | 99.96 or more | 35.00 | 50.00 | 0.00 | 85.00 | 2.00 | 0.24 | 0.11 | 2.35 |
|  | 26 | 99.96 or more | 25.00 | 65.00 | 40.00 | 130.00 | 5.00 | 0.19 | 0.15 | 5.34 |

TABLE 2-continued

|  |  |  |  |  |  |  |  |  |  |
|---|---|---|---|---|---|---|---|---|---|
|  | 27 | 99.96 or more | 320.00 | 0.10 | 0.00 | 320.10 | 10.00 | 0.60 | 0.50 | 11.10 |
| Comparative Examples | 1 | 99.96 or more | 0.00 | 0.00 | 0.00 | 0.00 | 3.00 | 0.20 | 0.10 | 3.30 |
|  | 2 | 99.96 or more | 0.00 | 0.00 | 0.00 | 0.00 | 3.00 | 0.10 | 0.10 | 3.20 |
|  | 3 | 99.96 or more | 315.00 | 0.00 | 0.00 | 315.00 | 4.00 | 0.15 | 0.10 | 4.25 |

| | | Component Composition (mass ratio) | | | | | | | |
|---|---|---|---|---|---|---|---|---|---|
| | | O (ppm) | P (ppm) | Ag (ppm) | Fe (ppm) | Pb (ppm) | Ag + Fe + Pb (ppm) | Mg (ppm) | B P + S + Se + Te + O (ppm) | A/B |
| Invention Examples | 16 | 2.00 | 0.10 | 35.00 | 5.00 | 2.00 | 42.00 | 18.00 | 2.58 | 5.8 |
| | 17 | 3.00 | 0.10 | 15.00 | 0.20 | 0.05 | 15.25 | 26.00 | 6.44 | 4.7 |
| | 18 | 2.00 | 0.20 | 10.00 | 0.30 | 0.06 | 10.36 | 5.00 | 5.63 | 8.9 |
| | 19 | 1.00 | 0.80 | 9.00 | 0.24 | 0.05 | 9.29 | 1.10 | 6.15 | 15.4 |
| | 20 | 1.00 | 0.20 | 13.00 | 0.50 | 0.06 | 13.56 | 68.00 | 3.54 | 3.7 |
| | 21 | 2.00 | 0.40 | 15.00 | 0.20 | 0.08 | 15.28 | 70.00 | 5.76 | 14.4 |
| | 22 | 3.00 | 0.30 | 18.00 | 0.30 | 0.04 | 18.34 | 2.00 | 7.66 | 6.1 |
| | 23 | 2.00 | 0.20 | 20.00 | 0.40 | 0.06 | 20.46 | 5.00 | 6.52 | 13.5 |
| | 24 | 2.00 | 0.40 | 1.80 | 0.10 | 0.05 | 1.95 | 1.00 | 10.80 | 11.1 |
| | 25 | 2.00 | 0.20 | 15.00 | 0.20 | 0.06 | 15.26 | 4.00 | 4.55 | 18.7 |
| | 26 | 110.00 | 3.10 | 13.00 | 1.50 | 0.04 | 14.54 | 0.00 | 118.44 | 1.1 |
| | 27 | 130.00 | 4.50 | 9.00 | 0.10 | 0.05 | 9.15 | 0.00 | 145.60 | 2.2 |
| Comparative Examples | 1 | 2.00 | 5.00 | 2.00 | 0.10 | 0.20 | 2.30 | 0.00 | 10.30 | 0.0 |
| | 2 | 3.00 | 3.50 | 3.00 | 0.20 | 0.10 | 3.30 | 0.00 | 9.70 | 0.0 |
| | 3 | 4.00 | 4.50 | 4.50 | 0.15 | 0.10 | 4.75 | 0.00 | 12.75 | 24.7 |

TABLE 3

| | | Producing Process | | | | | | | | | | Temper Rolling |
|---|---|---|---|---|---|---|---|---|---|---|---|---|
| | | First Hot Rolling | | | Second Hot Rolling | | | Cold Rolling | | Heat Treatment | | Rolling |
| | | Rolling Ratio (%) | Average Reduction (%) | Final Temperature (° C.) | Rolling Ratio (%) | Average Reduction (%) | Final Temperature (° C.) | Rolling Ratio (%) | Average Reduction (%) | Temperature (° C.) | Time (sec) | Ratio (%) |
| Invention Examples | 1 | 67 | 20 | 700 | 67 | 20 | 700 | 59 | 20 | 800 | 60 | 9 |
| | 2 | 67 | 20 | 800 | 67 | 20 | 800 | 68 | 25 | 800 | 60 | 10 |
| | 3 | 67 | 20 | 850 | 67 | 20 | 850 | 48 | 15 | 800 | 120 | 9 |
| | 4 | 67 | 20 | 750 | 67 | 20 | 750 | 48 | 15 | 800 | 120 | 9 |
| | 5 | 56 | 15 | 850 | 56 | 15 | 850 | 68 | 25 | 800 | 120 | 9 |
| | 6 | 56 | 15 | 650 | 56 | 15 | 650 | 68 | 25 | 800 | 120 | 9 |
| | 7 | 67 | 20 | 700 | 67 | 20 | 700 | 48 | 15 | 800 | 120 | 9 |
| | 8 | 56 | 15 | 800 | 56 | 15 | 800 | 59 | 20 | 800 | 120 | 9 |
| | 9 | 67 | 20 | 800 | 67 | 20 | 800 | 68 | 25 | 800 | 180 | 10 |
| | 10 | 67 | 20 | 800 | 67 | 20 | 800 | 68 | 25 | 800 | 60 | 5 |
| | 11 | 67 | 20 | 850 | 67 | 20 | 850 | 59 | 20 | 800 | 60 | 10 |
| | 12 | 67 | 20 | 700 | 67 | 20 | 700 | 59 | 20 | 850 | 60 | 12 |
| | 13 | 56 | 15 | 650 | 56 | 15 | 650 | 59 | 20 | 750 | 10 | 20 |
| | 14 | 56 | 15 | 650 | 56 | 15 | 650 | 59 | 20 | 900 | 60 | 10 |
| | 15 | 67 | 20 | 850 | 67 | 20 | 850 | 59 | 20 | 850 | 60 | 10 |

TABLE 4

| | | Producing Process | | | | | | | | | | Temper Rolling |
|---|---|---|---|---|---|---|---|---|---|---|---|---|
| | | First Hot Rolling | | | Second Hot Rolling | | | Cold Rolling | | Heat Treatment | | Rolling |
| | | Rolling Ratio (%) | Average Reduction (%) | Final Temperature (° C.) | Rolling Ratio (%) | Average Reduction (%) | Final Temperature (° C.) | Rolling Ratio (%) | Average Reduction (%) | Temperature (° C.) | Time (sec) | Ratio (%) |
| Invention Examples | 16 | 67 | 20 | 700 | 67 | 20 | 700 | 48 | 15 | 800 | 60 | 5 |
| | 17 | 67 | 20 | 650 | 67 | 20 | 650 | 59 | 20 | 800 | 60 | 0 |
| | 18 | 67 | 20 | 700 | 67 | 20 | 700 | 48 | 15 | 850 | 60 | 15 |
| | 19 | 67 | 20 | 700 | 67 | 20 | 700 | 68 | 25 | 850 | 60 | 10 |
| | 20 | 67 | 20 | 800 | 67 | 20 | 800 | 68 | 25 | 800 | 60 | 10 |
| | 21 | 56 | 15 | 850 | 56 | 15 | 850 | 68 | 25 | 750 | 10 | 10 |
| | 22 | 67 | 20 | 650 | 67 | 20 | 650 | 59 | 20 | 900 | 15 | 8 |
| | 23 | 56 | 15 | 850 | 56 | 15 | 850 | 48 | 15 | 750 | 60 | 8 |
| | 24 | 67 | 20 | 750 | 67 | 20 | 750 | 68 | 25 | 800 | 60 | 20 |
| | 25 | 67 | 20 | 800 | 67 | 20 | 800 | 48 | 15 | 750 | 60 | 20 |
| | 26 | 56 | 15 | 650 | 56 | 15 | 650 | 59 | 20 | 800 | 60 | 20 |
| | 27 | 56 | 15 | 800 | 56 | 15 | 700 | 68 | 25 | 850 | 60 | 10 |
| Comparative Examples | 1 | 89 | 20 | 850 | — | — | — | 90 | 10 | 550 | 120 | 25 |
| | 2 | 40 | 5 | 550 | 56 | 15 | 650 | 48 | 15 | 750 | 60 | 35 |
| | 3 | 56 | 15 | 850 | 40 | 5 | 550 | 80 | 15 | 750 | 60 | 30 |

TABLE 5

| | | Evaluation | | | | | | | After Pressure-Heat Treatment | |
|---|---|---|---|---|---|---|---|---|---|---|
| | | | | | Standard | | Number | | | |
| | | Average Crystal Grain Size (μm) | Average of LOS (°) | Average of GOS (°) | Deviation of KAM Value (°) | Average of GND (×$10^{14}$m$^{-2}$) | Density of Compounds ($10^{-4}$ pieces/μm$^2$) | Presence or Absence of Compounds | Average Crystal Grain Size | Variation in Grain Size |
| Invention Examples | 1 | 54 | 0.54 | 1.41 | 0.20 | 2.71 | 1.1 | D | B | B |
| | 2 | 50 | 0.60 | 1.31 | 0.23 | 2.45 | 0.9 | D | B | C |
| | 3 | 38 | 0.59 | 1.01 | 0.23 | 3.51 | 0.0 | D | C | C |
| | 4 | 50 | 0.37 | 1.22 | 0.12 | 2.02 | 1.2 | D | B | B |
| | 5 | 60 | 0.41 | 1.04 | 0.14 | 2.16 | 9.0 | B | A | B |
| | 6 | 46 | 0.51 | 1.18 | 0.20 | 2.40 | 66.0 | B | A | B |
| | 7 | 51 | 0.48 | 0.86 | 0.19 | 2.98 | 103.0 | B | A | B |
| | 8 | 52 | 0.49 | 1.12 | 0.20 | 3.55 | 153.0 | B | B | B |
| | 9 | 71 | 0.53 | 1.30 | 0.42 | 1.66 | 1.2 | D | C | B |
| | 10 | 48 | 0.72 | 1.03 | 0.42 | 2.30 | 0.9 | B | B | B |
| | 11 | 30 | 0.80 | 1.36 | 0.35 | 3.32 | 34.2 | B | A | B |
| | 12 | 63 | 0.83 | 1.52 | 0.50 | 3.56 | 33.5 | B | B | B |
| | 13 | 10 | 1.53 | 1.69 | 0.76 | 5.05 | 114.8 | B | B | C |
| | 14 | 98 | 0.86 | 1.36 | 0.31 | 3.32 | 66.0 | B | B | B |
| | 15 | 61 | 0.79 | 1.39 | 0.45 | 3.18 | 153.0 | B | B | B |

TABLE 6

| | | Evaluation | | | | | | | After Pressure-Heat Treatment | |
|---|---|---|---|---|---|---|---|---|---|---|
| | | | | | Standard | | Number | | | |
| | | Average Crystal Grain Size (μm) | Average of LOS (°) | Average of GOS (°) | Deviation of KAM Value (°) | Average of GND (×$10^{14}$m$^{-2}$) | Density of Compounds ($10^{-4}$ pieces/μm$^2$) | Presence or Absence of Compounds | Average Crystal Grain Size | Variation in Grain Size |
| Invention Examples | 16 | 57 | 0.68 | 1.01 | 0.32 | 2.53 | 7.8 | B | B | B |
| | 17 | 61 | 0.33 | 0.74 | 0.43 | 1.71 | 32.0 | B | A | B |
| | 18 | 51 | 0.93 | 1.64 | 0.30 | 4.18 | 35.1 | B | A | B |
| | 19 | 89 | 0.68 | 1.40 | 0.50 | 3.11 | 44.5 | B | A | B |
| | 20 | 63 | 0.76 | 1.32 | 0.48 | 3.32 | 45.0 | B | B | B |
| | 21 | 19 | 0.83 | 1.31 | 0.28 | 3.11 | 66.0 | B | A | B |
| | 22 | 49 | 0.79 | 1.18 | 0.39 | 2.78 | 94.8 | B | A | B |

TABLE 6-continued

|  |  | Evaluation | | | | | | After Pressure-Heat Treatment | |
|---|---|---|---|---|---|---|---|---|---|
|  |  |  | Standard | | Number | | | | |
|  |  | Average Crystal Grain Size (μm) | Average of LOS (°) | Average of GOS (°) | Deviation of KAM Value (°) | Average of GND (×10^14 m^−2) | Density of Compounds (10^−4 pieces/μm^2) | Presence or Absence of Compounds | Average Crystal Grain Size | Variation in Grain Size |
|  | 23 | 49 | 0.76 | 1.14 | 0.30 | 2.99 | 108.0 | B | A | B |
|  | 24 | 35 | 1.16 | 2.10 | 0.76 | 4.80 | 121.6 | B | C | B |
|  | 25 | 52 | 1.90 | 1.57 | 0.34 | 3.93 | 140.4 | B | B | B |
|  | 26 | 46 | 0.91 | 2.05 | 0.72 | 5.01 | 145.8 | B | B | B |
|  | 27 | 50 | 1.95 | 2.07 | 0.70 | 4.90 | 321.5 | B | C | C |
| Comparative Examples | 1 | 8 | 2.10 | 2.20 | 1.10 | 7.30 | 0.0 | D | D | D |
|  | 2 | 35 | 2.30 | 2.50 | 0.90 | 8.13 | 1.3 | D | D | D |
|  | 3 | 32 | 2.16 | 2.32 | 0.87 | 7.72 | 303.4 | B | C | D |

In Comparative Example 1, the average crystal grain size was 8 μm which was small, and the average of LOS was 2.10°, the crystal grains became coarsened after the pressure-heat treatment, and the variation in grain size was also large.

In Comparative Example 2, the average of LOS was 2.30°, the crystal grains became coarsened after the pressure-heat treatment, and the variation in grain size was also large.

In Comparative Example 3, the average of LOS was 2.16°, and the variation in grain size was large after the pressure-heat treatment.

In contrast, in Invention Examples 1 to 27, the average crystal grain size was 10 μm or more, the average of LOS was 2.000 or less, the average crystal grain size was small after the pressure-heat treatment, and the variation in grain size was also small.

From the above, it was confirmed that, according to Invention Examples, it is possible to provide a pure copper material in which it is possible to suppress the coarsening and nonuniformity of crystal grains even after the pressure-heat treatment.

INDUSTRIAL APPLICABILITY

A pure copper material according to the present embodiment is suitably applied to electrical and electronic components such as heatsinks and thick copper circuits.

REFERENCE SIGNS LIST

1 Electronic device
3 Electronic component
10 Insulating substrate
11 Ceramics substrate
12 Circuit layer
13 Metal layer

The invention claimed is:

1. A pure copper material, comprising:
Cu, wherein
an amount of Cu is in a range of 99.9 mass % or more and 99.999 mass % or less,
an average crystal grain size in a rolled surface is 10 μm or more, and
when a measurement area of 1 mm$^2$ or more is measured by an EBSD method at a measurement interval of 1 μm, measurement points at which a CI value obtained by an analysis using data analysis software OIM is 0.1 or less are excluded, and boundaries between adjacent pixels with a misorientation of 5° or more are regarded as crystal grain boundaries, an average of local orientation spread (LOS) is 2.00° or less.

2. The pure copper material according to claim 1, wherein, when a measurement area of 1 mm$^2$ or more is measured by an EBSD method at a measurement interval of 1 μm, measurement points at which a CI value obtained by an analysis using data analysis software OIM is 0.1 or less are excluded, and boundaries between adjacent pixels with a misorientation of 5° or more are regarded as crystal grain boundaries, an average of grain orientation spread (GOS) is 2.00° or less.

3. The pure copper material according to claim 1, wherein, when a measurement area of 1 mm$^2$ or more is measured by an EBSD method at a measurement interval of 1 μm, measurement points at which a CI value obtained by an analysis using data analysis software OIM is 0.1 or less are excluded, and boundaries between adjacent pixels with a misorientation of 5° or more are regarded as crystal grain boundaries, a value of standard deviation of a kernel average misorientation (KAM) value is 0.75° or less.

4. The pure copper material according to claim 1, wherein, when a measurement area of 1 mm$^2$ or more is measured by an EBSD method at a measurement interval of 1 μm, measurement points at which a CI value obtained by an analysis using data analysis software OIM is 0.1 or less are excluded, and boundaries between adjacent pixels with a misorientation of 5° or more are regarded as crystal grain boundaries, an average of geometrically necessary dislocations (GNDs) is $5.0 \times 10^{14}$ m$^{-2}$ or less.

5. The pure copper material according to claim 1, further comprising one or more additive elements selected from Ca, Sr, and Ba in a total amount of 300 mass ppm or less.

6. The pure copper material according to claim 5, further comprising a compound containing at least one of the additive elements and Cu, wherein
a number density of the compounds is $1 \times 10^{-4}$ pieces/μm$^2$ or more.

7. The pure copper material according to claim 6, wherein the compound includes one or more selected from $Cu_5Ca$, $Cu_5Sr$, and $Cu_{13}Ba$.

8. The pure copper material according to claim 1, further comprising one or more selected from S, Se, and Te in a total amount of 10.0 mass ppm or less.

9. The pure copper material according to claim 1, further comprising O whose amount is 100 mass ppm or less.

10. The pure copper material according to claim 1, further comprising P whose amount is in a range of 0.01 mass ppm or more and 3.00 mass ppm or less.

11. The pure copper material according to claim 1, further comprising Ca, Sr, Ba, P, S, Se and Te, wherein
a mass ratio A/B of a total amount A of Ca, Sr, and Ba to a total amount B of P, S, Se, Te, and O is more than 1.0.

12. The pure copper material according to claim 1, further comprising one or more selected from Ag, Fe, and Pb in a total amount of 50.0 mass ppm or less.

13. The pure copper material according to claim 1, further comprising Mg in an amount of 100 mass ppm or less.

14. An insulating substrate comprising:
a ceramics substrate; and
a copper sheet bonded to one surface of the ceramics substrate,
wherein the copper sheet is formed of the pure copper material according to claim 1.

15. An electronic device comprising:
the insulating substrate according to claim 14; and
an electronic component mounted on the insulating substrate.

* * * * *